Patented May 18, 1943

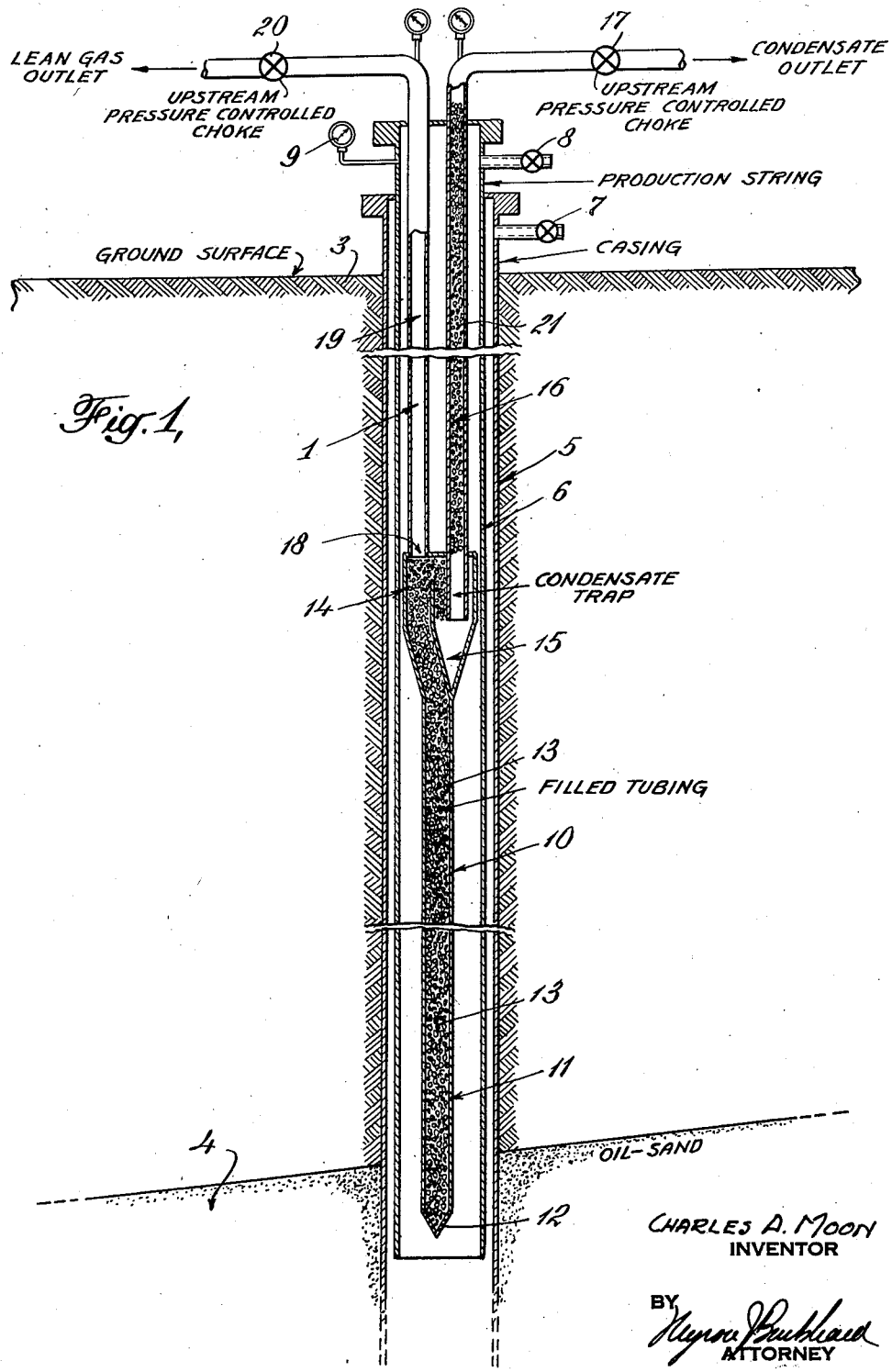

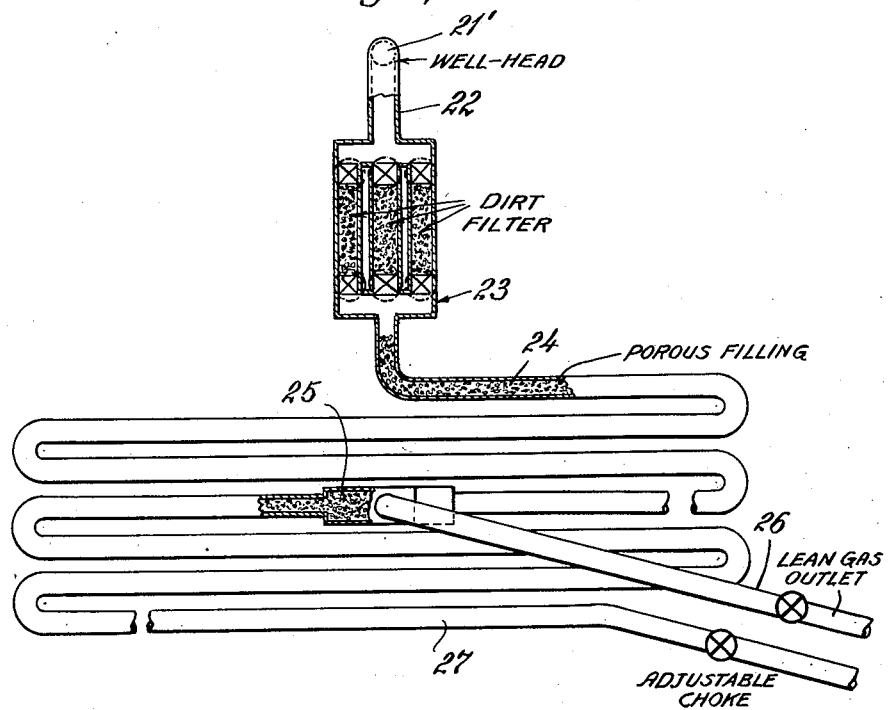
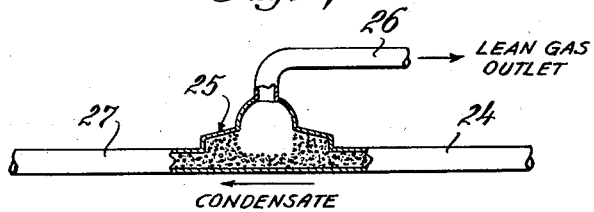

2,319,702

UNITED STATES PATENT OFFICE 2,319,702

METHOD AND APPARATUS FOR PRODUCING OIL WELLS

Charles A. Moon, New York, N. Y., assignor to Socony-Vacuum Oil Company, Incorporated, New York, N. Y., a corporation of New York Application April 4, 1941, Serial No. 386,755

5 Claims. (Cl. 166—2)

The present invention is directed generally to methods and apparatus for producing oil wells, and has particularly to do with the handling of wells where high gas/oil ratios, or high formation pressures, or both, render the utilization of the more common methods and apparatus inadequate.

When gas and oil, in admixture, at high pressure, are being produced from a well, it is quite desirable to prevent uncontrolled separation of the gas from the oil. To this end, several methods have so far been adopted, such as, for example, gravel packing, and various choking arrangements. The general aim of such procedures is to prevent drop of pressure occurring to such an extent, below the existing formation pressure, as to create conditions which either cause the separation of a gaseous phase at some point where it may impede the flow of fluid oil into the producing well, or from the producing well, or in other cases, within the region of pressure-temperature conditions which have been designated as "retrograde condensation" conditions, cause the separation and possible loss within the formation of a liquid phase. The most usual procedure for maintaining formation pressure is some form of high pressure separation of liquid from gas at the well head, i. e., above ground, usually followed by return of the separated gases to the producing formation.

It is an object of this invention to provide a convenient and economical method and means for handling the problem of producing wells where high formation pressures exist, which may or may not be accompanied by high gas/oil ratios.

An important object is the localization, at a point capable of control, of the drop in pressure usually utilized for separation of gases and fluids.

A further object is the provision of method and means whereby the drop in pressure may be so accomplished, in a stepwise manner, as to avoid many of the difficulties incident upon present methods, as for example the uncontrolled formation of gas hydrates.

A further object is the provision of methods whereby the inherent energy of the gas-fluid mixture emerging from the formation is most efficiently conserved and utilized in the lifting of the oil to the surface.

All these and other advantages, as will hereinafter appear, I accomplish by passing the hydrocarbon mixture, in the form in which it occurs within the producing formation, with a minimum of pressure drop, into a flow tube, partially or wholly filled with some porous and/or permeable material, such as sand, lime, charcoal, activated charcoal, gravel, alumina, or other porous material, catalyst, or structure of labyrinth nature, through which the mixture passes and in passage therethrough is subjected to a gradual or purposely stepped pressure drop.

For a clearer understanding of my invention, reference is now made to the drawings made a part of this specification, wherein, in a diagrammatic form, Figure 1 shows my invention as applied within a well, and Figure 2 as applied at the surface in connection with a producing well, Figure 3 is a detail of a portion of Figure 2.

Turning now to Figure 1, there is shown in diagram form a bore-hole extending from the surface 3 to an oil-sand 4 cased by casing 5. Within the casing there is placed a production string of pipe 6, the casing and production string being provided according to usual practice with one or more valved outlets, pressure gauges 9 and other usual appurtenances. Within the production string 6 there is suspended an assemblage of tubing, etc., embodying my invention. This assemblage terminates at its lower end in a pipe 10, the low end of which, 11, is open to the producing formation 4 through a suitable screen or other device designated by 12. The interior of pipe 10 is filled with a suitable porous packing material 13, as above described. The depth of packing, i. e., the length of the packed pipe 10 is such that, in travelling therethrough the fluid mixture as produced from the formation encounters sufficient pressure drop to reduce the pressure exerted upon the mixture from formation pressure to that pressure at which it is desired to effect a separation of gas from oil. It will be seen that by this means I am able to retain substantially full formation pressure at the face of the formation, while at the same time progressively and in stepwise fashion reducing the pressure upon the mixture to that pressure fixed upon as desirable for separation of gas from oil.

Further by choice of packing material and by arrangement of packing material, I may make the pressure reduction of a greater or less rapidity, as desired.

Returning to Figure 1, and having, as explained, reduced the pressure upon the mixture to that pressure desired for separation of gas and oil, the mixture is led into a condensate trap or liquid-gas separator, designated as 14, wherein liquid oil may collect at 15 to be passed to the surface through pipe 16 and "produced" through valved outlet 17, while gas, collected at 18, is passed to the surface through pipe 19 and valved outlet 20.

In the normal case, in repressuring operations, wherein the separated gas is recompressed to formation pressure and reintroduced to the sand, the primary separation will be conducted at a relatively high pressure as near the formation pressure as can be held and still get a desirable separation. In such cases the fluid separated in separator 14 must be further reduced in pressure before being sent through usual lower pressure surface equipment, such as stabilizers, gas recovery plants, and the like. In this case I find it quite convenient to establish within pipe 16 a further packing 21, in the interstices of which a further pressure drop occurs. This further pressure drop of course effects a further evolution of gas from the material flowing through pipe 16, and the mixture emerging from pipe 16 is led to a separator of usual type at the surface, the gas and liquid thereafter being handled in the usual manner.

In some instances, such as, for example, when the fluid mixture entering the well carries with it dirt, it is not advisable to place the pressure drop mechanism within the well. In such cases I may adopt, with equally good results, the arrangement shown diagrammatically in Figure 2, the whole of which is preferably at the surface. In Figure 2, leading from the well-head 21 a pipe 22 leads to any convenient type of dirt trap or filter designated by 23. Fluid mixture from filter 23 passes into packed tube 24 which exercises the same function as does the packed tube 10 of Figure 1, previously explained. Similarly, there are provided separator 25, lean gas outlet 26, and secondary expander 27, all functioning as did corresponding parts previously explained. In Fig. 3, again in diagram, there is shown an elevation of separator 25, like parts carrying the same numbers as in Figure 2.

This method and apparatus are particularly useful in connection with the operation of "distillate" wells produced at pressures within the "retrograde condensation" range. That is to say, with wells where the hydrocarbons in the production zone appear to exist as a single gaseous phase, or in a mixture of high gas/oil ratio, and at pressures such that reduction of pressure appears to increase the amount of liquid phase present. In such cases, it is obvious that I am able to prevent the reduction of pressure within the formation with the attendant increase of liquid phase therein, resulting in possible loss of such liquid, that I perform such reduction of pressure in a controlled manner at a point where the liquid so separated can be recovered, and that I am able to carry out both operations with a minimum loss of pressure in the gas which will be recycled and without the use of extensive systems of high pressure separator equipment at the surface.

Another function of the packed pressure drop tubing is of interest and worthy of examination. In the packed tube 10 of Figure 1, within the interstices of packing 13, due to the pressure drop, there is an evolution of gas. Due to the smallness of each decrease in pressure the amount formed at any point is not relatively large, and due to the relatively small volume of the interstices there is no real phase separation, consequently the evolution of gas within the ascending column assists in the upward movement of fluid, instead of retarding it as would be the case in an open tube, as frequently occurs in poorly managed gas-lift operations. It is upon this basis that the packed tube 16 of Figure 1 can be used for lifting, with concurrent pressure drop, a material which at its entry thereto is substantially liquid. Due to this fact I can also make use of a packed tube, like tube 10 of Figure 1, as a device for producing wells under gas lift where sufficiently high gas/oil ratio exist or can be provided at the bottom of the tube 10. In such cases, it is frequently possible to dispense with the gas/oil separator and after expansion tube.

It will be seen that I have thus provided a method of and means for producing wells capable of being applied effectively under a wide variety of circumstances. This method revolves around a means, namely a flow tube packed with a porous permeable material, in which graduated and stepwise pressure drop may occur without concomitant separation of gaseous phase from liquid phase.

As pointed out previously the packing mentioned may be any material such as gravel or any other particle from packing material, or may even be a labyrinthic mass constructed of metal or other material, with proper interstitial passages therein. All these I deem equivalents and claim, except as limited by the claims appended hereto.

I claim:

1. The method of producing an oil well which comprises, passing the homogeneous fluid mixture as withdrawn from the producing formation, substantially at formation pressure and without prior substantial separation of constituents thereof, into and through a closed upwardly extending column filled with a continuous body of porous permeable material, said column being located within the well, the column being of sufficient length to bring about separation of the constituents of the fluid mixture upon complete passage therethrough, while during passage through said column a progressively stepwise pressure drop occurs without substantial simultaneous separation of gas phase from oil phase, thereby maintaining a gas-lift effect within the column while separate withdrawal of gas and liquid phases may be effected at the egress opening thereof.

2. The method of producing an oil well which comprises, passing the homogeneous fluid mixture as withdrawn from the producing formation, substantially at formation pressure and without prior substantial separation of constituents thereof, into and through a closed column filled with a continuous body of porous permeable material, the column being of sufficient length to bring about separation of the constituents of the fluid mixture upon complete passage therethrough, while during passage through said column a progressively stepwise pressure drop occurs without substantial simultaneous separation of gas phase from oil phase, thereby maintaining a gas-lift effect within the column, separately withdrawing gas and liquid phases at the upper end of the column withdrawing the liquid phase so separated through a further upwardly extending closed column filled with a continuous body of porous permeable material for further progressive pressure drop without substantial simultaneous separation of a second gas phase.

3. The method of producing distillate wells from formations at pressures above the retrograde condensation range which comprises, passing the formation homogeneous fluid mixture, without substantial decrease of formation pressure into and through a closed column filled with a continuous body of porous permeable material, the column being of sufficient length to bring about separation of the constituents of the fluid mixture upon complete passage therethrough, while during passage through said column a progressively stepwise pressure drop occurs without substantial simultaneous separation of gas phase from oil phase, thereby maintaining a gas-lift effect within the column, separately withdrawing gas and liquid phases at the upper end of the column, withdrawing the liquid phase so separated through a further closed column filled with a continuous body of porous permeable material for further progressive pressure drop without substantial simultaneous separation of a second gas phase.

4. In combination with a hydrocarbon producing well, means disposed substantially vertically within the well defining an elongate column filled with a continuous body of porous permeable material, said column being closed except for ingress and egress openings at its opposite ends, the ingress end being adjacent the producing stratum, means for sealing the well against flow except through the ingress end of said column so that the homogeneous fluid mixture produced may pass into the column without substantial prior reduction of formation pressure, the length of said column being such that the homogeneous fluid mixture will be separated into its constituents upon complete passage therethrough while during passage therethrough a progressive stepwise pressure drop occurs without substantial simultaneous separation of gas phase from oil phase, means at the egress opening of said column for dividing the fluid emerging therefrom into a gas phase and an oil phase and means to separately withdraw said phases.

5. In combination with a hydrocarbon producing well, means defining a passage packed with a continuous body of porous permeable material, means for sealing the well so that the fluid mixture to be produced must pass into the passage without substantial prior reduction of formation pressure, said passage being of sufficient length to effect progressive reduction of pressure to that pressure level desired for a first separation of gaseous and liquid phases of the fluid mixture while said fluid passes therethrough, and having interstitial passages of insufficient volume to permit substantial separation of gas phase and oil phase therein, separating means to divide the fluid emerging therefrom into a gas phase and an oil phase, and means to separately withdraw said phases, the oil phase withdrawal means being means defining a similar passage packed with a continuous body of porous permeable material and acting to further reduce pressure to a level desired for a secondary gas phase separation.

CHARLES A. MOON.